H. EICHELER.
CENTRIFUGAL PUMP.
APPLICATION FILED DEC. 27, 1916.
1,412,105. Patented Apr. 11, 1922.
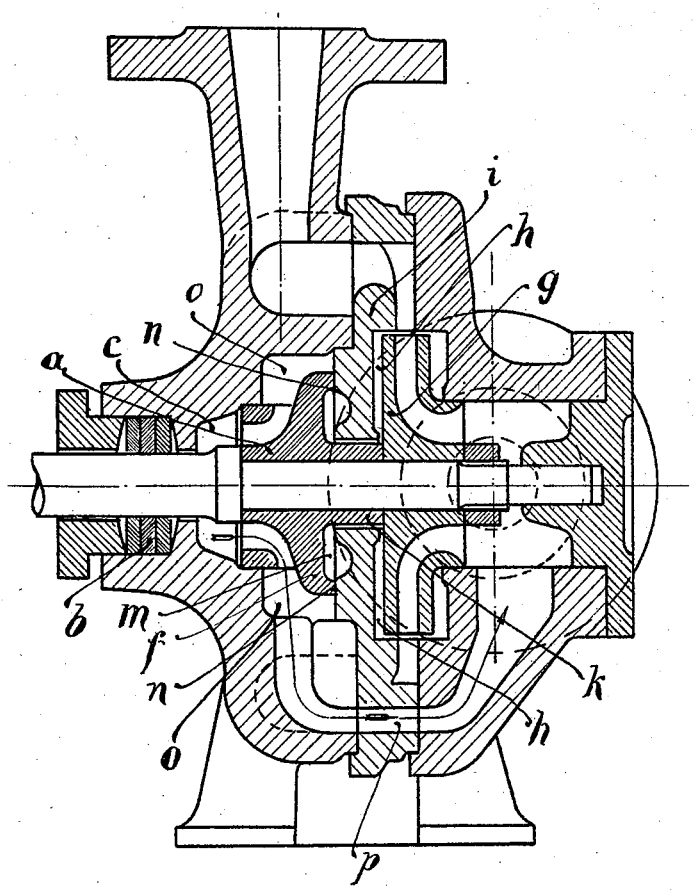
Inventor
H. Eicheler
by F. Dittmar
Attorney

UNITED STATES PATENT OFFICE.

HANS EICHELER, OF WESSELING, NEAR COLOGNE, GERMANY.

CENTRIFUGAL PUMP.

1,412,105. Specification of Letters Patent. Patented Apr. 11, 1922.

Application filed December 27, 1916. Serial No. 139,203.

(GRANTED UNDER THE PROVISIONS OF THE ACT OF MARCH 3, 1921, 41 STAT. L., 1313.)

*To all whom it may concern:*

Be it known that I, HANS EICHELER, subject of the King of Prussia, German Emperor, residing at Wesseling, near Cologne, Province of the Rhine, Germany, have invented certain new and useful Improvements in Centrifugal Pumps, (for which I have filed an application in Germany August 6, 1914,) of which the following is a specification, reference being had therein to the accompanying drawing.

This invention pertains to certain new and useful improvements in centrifugal pumps.

Heretofore it has been proposed to apply to the back of the wheel of a centrifugal pump an auxiliary wheel intended to relieve the stuffing box. Such devices, however, have not, under all circumstances, served the purpose for which they are designed, especially if the pump acts not only as a sucking pump, but is also intended for liquids supplied to it.

The present invention has for its objects among others to provide an improved construction of this general character which will afford complete relief of the stuffing box, and to accomplish this in a most simple and efficient manner. To accomplish my object I combine the auxiliary wheel with a thrust balancing disc which serves to throttle the liquid supplied to the auxiliary wheel.

Other objects and advantages of the invention will hereinafter appear and the novel features thereof will be particularly pointed out in the appended claims.

The invention is clearly illustrated in the accompanying drawing which represents a cross section of a centrifugal pump embodying my present improvement.

Referring to the drawings, $a$ designates the auxiliary wheel, $b$ the stuffing box, and $c$ the chamber for the liquid entering back into the auxiliary wheel. $f$ is the relieving disc, and $g$ is the main wheel of the pump.

$i$ designates a part of the casing between which and the wheel $g$ is a chamber $h$.

$m$ is a chamber between the part $i$ of the casing and the relieving disc $f$.

$o$ is a chamber surrounding the auxiliary wheel $a$ and from which chamber leads a channel or passage $p$ connected in any suitable manner to the sucking side of the pump.

The operation is as follows:—the pressure produced by the main wheel $g$ exists in the chamber $h$ between the main wheel $g$ and the part $i$ of the casing. The hub $k$ of the relieving disc $f$ is mounted to revolve with slight play within an opening in said part $i$, so that the pressure of the liquid from the chamber $h$ and the passage around the said hub $k$ entering the chamber $m$ which is formed partly in the part $i$ and partly in the relieving disc $f$, is strongly throttled. Hence, the pressure in said chamber $m$ being comparatively reduced, the thrust balancing disc is pressed at its end almost with the full overpressure produced by the rotor or wheel $g$ against the part $i$ of the casing, so that at the point $n$ strong throttling will take place and the inner overpressure is also completely compensated, the stuffing box being, consequently, practically completely relieved. When the pump is sucking, the liquid, passing into the chamber $o$, is led off through the channel $p$ connected in any way to the sucking side of the pump, to the latter, so that it cannot reach the stuffing box. The throttling at $n$ is also independent from the wear and tear, the thrust balancing disc $f$ being at all times strongly pressed against the part $i$ of the casing.

Should, however, the throttling by the relieving disc $f$ be insufficient, the auxiliary wheel $a$ will have a supplemental action by exerting a corresponding counterpressure for overcoming the pressure of liquid still left at the throttling, and, hence, it will completely relieve the stuffing box. This would be especially true if the liquid is supplied to the pump, and the stuffing box would, otherwise, become, through the channel $p$, connected to the other side of the pump, under the pressure of the incoming liquid.

What I claim as new is:—

1. In a centrifugal pump, the combination of a rotor, an auxiliary wheel mounted at the back thereof and a thrust balancing disc connected to said auxiliary wheel, with a member interposed between said rotor and disc, there being a chamber between said disc and member to receive fluid under pressure which is relieved by movement of the disc from the member, and a chamber for the liquid entering back into the auxiliary wheel.

2. The combination of a rotor and an auxiliary wheel, with a fixed portion of the casing therebetween, a thrust balancing disc mounted at the back of said auxiliary wheel, there being a chamber between said disc and said portion of the casing to receive fluid under pressure which is relieved by movement of the disc from said portion, and a stuffing box, with a suction chamber between the same and the auxiliary wheel and in communication with the suction side of the rotor.

3. The combination of a rotor and an auxiliary wheel, with a fixed portion of the casing therebetween, a thrust balancing disc mounted at the back of said auxiliary wheel, there being a chamber between said disc and said portion of the casing to receive fluid under pressure which is relieved by movement of the disc from said portion, and a stuffing box, with a suction chamber between the same and the auxiliary wheel and in communication with the suction side of the rotor, and a chamber between said rotor and said portion of the casing and in communication with the first-named chamber.

In testimony whereof I affix my signature in the presence of two witnesses.

HANS EICHELER.

Witnesses:
B. HONUBITZER,
T. HEISFER.